Dec. 29, 1953 R. W. WALKER 2,664,042
FRUIT JUICE EXTRACTING DEVICE
Filed April 11, 1952 3 Sheets-Sheet 1
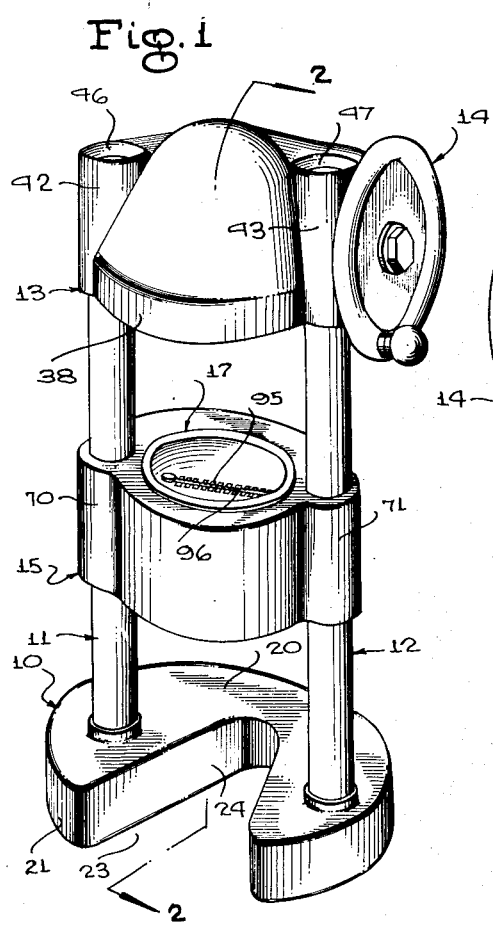
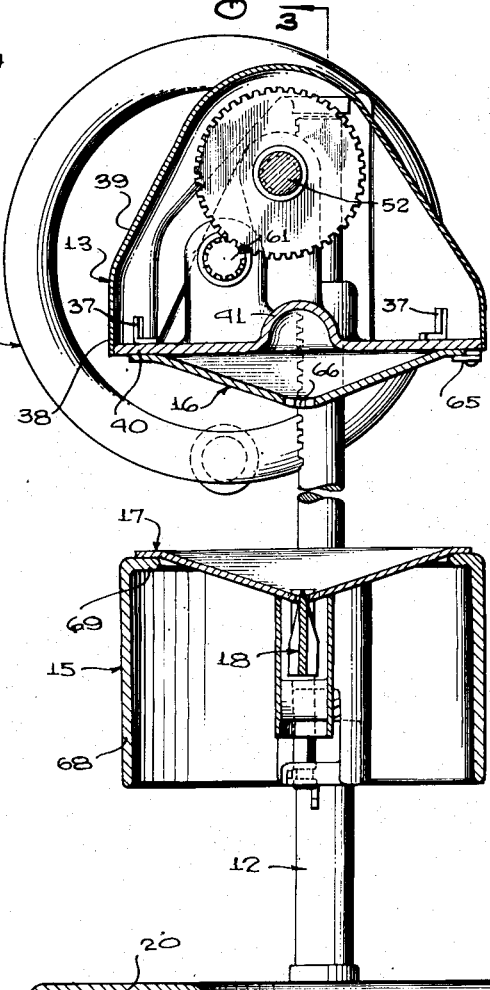
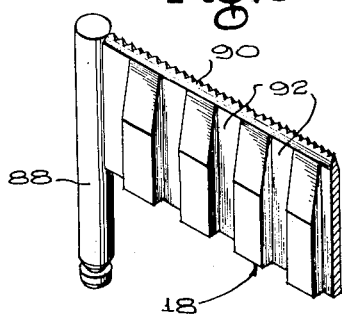
INVENTOR.
RONALD W. WALKER
BY
McMorrow, Berman & Davidson
ATTORNEYS Dec. 29, 1953   R. W. WALKER   2,664,042
FRUIT JUICE EXTRACTING DEVICE
Filed April 11, 1952   3 Sheets-Sheet 2
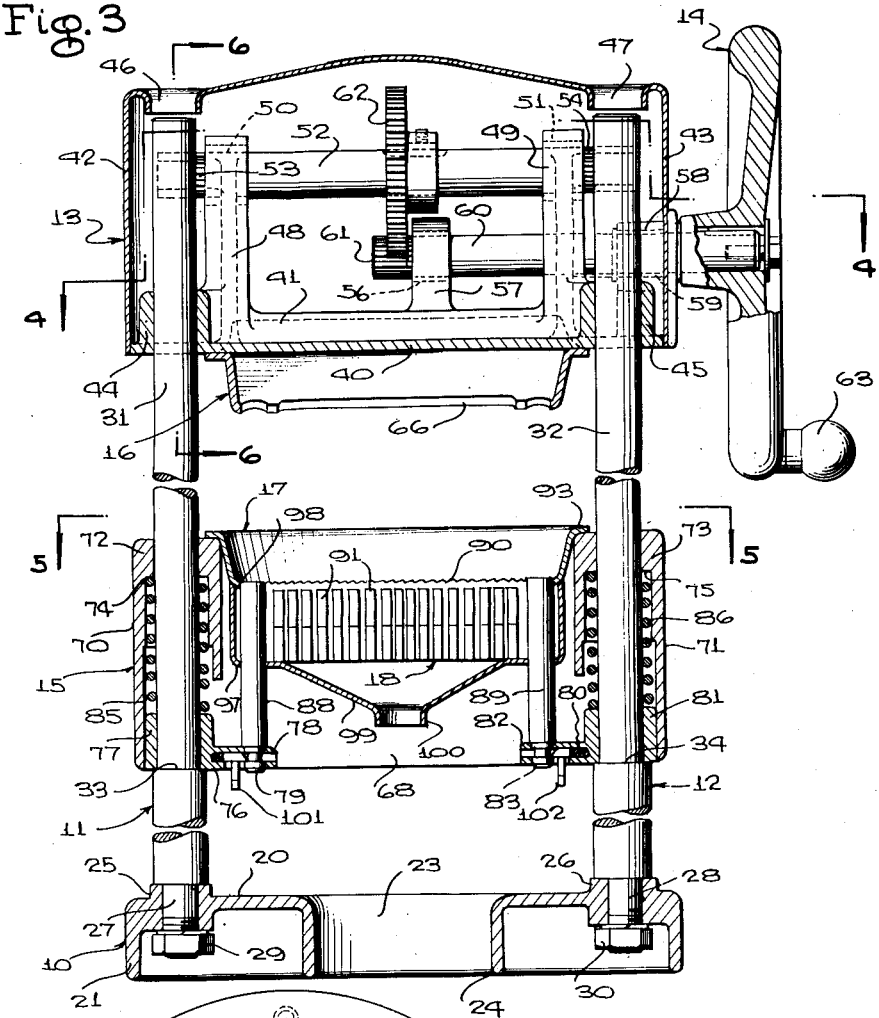
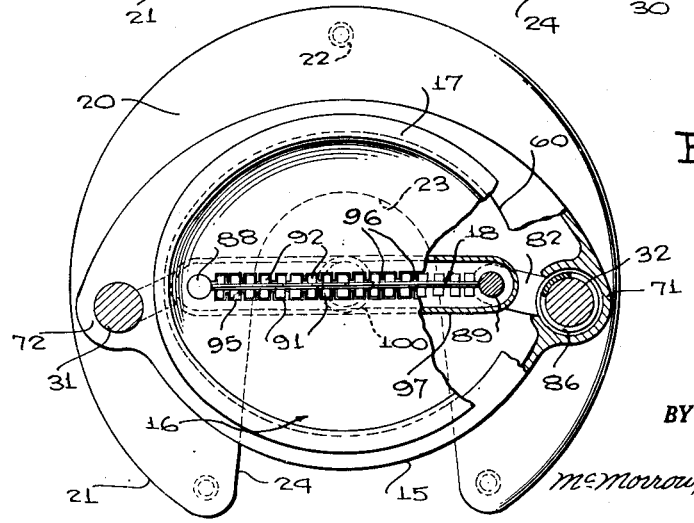
INVENTOR.
RONALD W. WALKER
BY
McMorrow, Berman & Davidson
ATTORNEYS Dec. 29, 1953  R. W. WALKER  2,664,042
FRUIT JUICE EXTRACTING DEVICE
Filed April 11, 1952  3 Sheets-Sheet 3
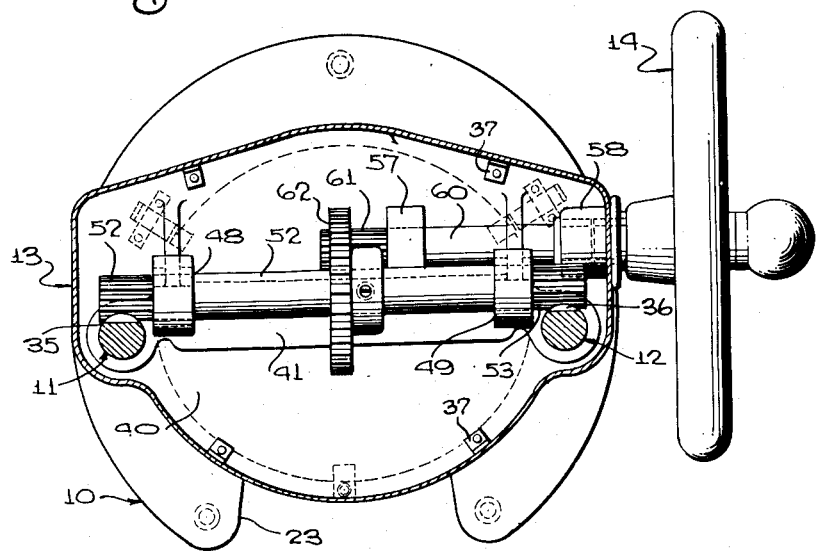
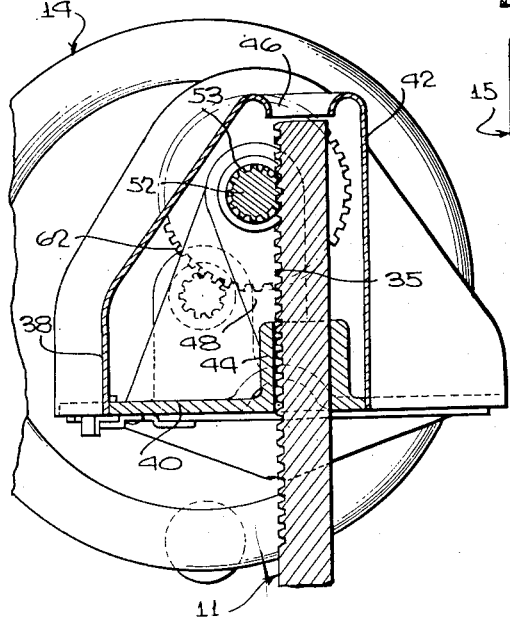
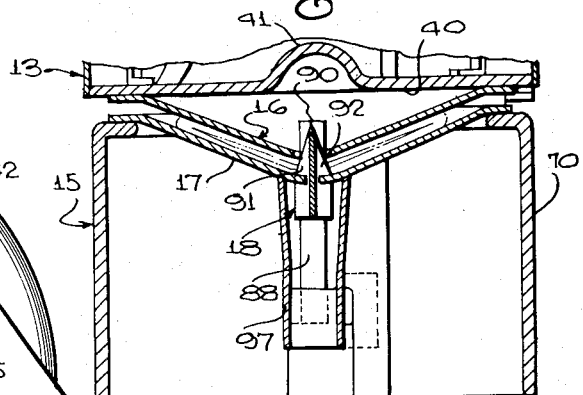
INVENTOR.
RONALD W. WALKER
BY
McMorrow, Berman & Davidson
ATTORNEYS Patented Dec. 29, 1953

2,664,042

UNITED STATES PATENT OFFICE 2,664,042

FRUIT JUICE EXTRACTING DEVICE

Ronald W. Walker, Borger, Tex., assignor of one-half to Eugene E. Piper, Borger, Tex.

Application April 11, 1952, Serial No. 281,800

4 Claims. (Cl. 100—98)

This invention relates to fruit juice extracting devices and more particularly to a portable device adapted to be mounted in a kitchen or restaurant or on a soda fountain for extracting juice from fruit, such as oranges, lemons, limes or grapefruit, the whole fruit at one time in one single operation.

It is among the objects of the invention to provide an improved fruit juice extractor which will thoroughly extract the juice from the whole fruit, such as oranges, lemons, grapefruit and limes, without contaminating the juice with rind oil from the fruit; which strains the juice to remove pulp and seeds therefrom; which receives the whole fruit and cuts it in two as it is squeezed to force the juice therefrom; which holds the fruit so that juice does not flow over the surface of the fruit and thus protects the juice from possible contamination; which can be operated either by hand or by an electric motor, as may be desired; and which is simple and durable in construction, economical to manufacture, effective and efficient in operation, and neat and attractive in appearance.

Other objects and advantages will become apparent from a consideration of the following description and the appended claims in conjunction with the accompanying drawings wherein:

Figure 1 is a perspective view of a fruit juice extractor illustrative of the invention;

Figure 2 is a cross sectional view on an enlarged scale on the line 2—2 of Figure 1;

Figure 3 is a cross sectional view on an enlarged scale on the line 3—3 of Figure 2;

Figure 4 is a transverse cross sectional view on the line 4—4 of Figure 3 with the structure on one side of the device partly broken away to better illustrate the construction thereof;

Figure 5 is a transverse cross sectional view on the line 5—5 of Figure 3;

Figure 6 is a fragmentary cross sectional view on the line 6—6 of Figure 3;

Figure 7 is a fragmentary cross sectional view similar to Figure 2, but showing the parts in a different operative position from that illustrated in Figure 2; and Figure 8 is a fragmentary perspective view of a blade constituting an operative component of the device.

With continued reference to the drawings, the juice extractor comprises, in general, a base 10, standards 11 and 12 projecting upwardly from the base in spaced apart and substantially parallel relationship to the base and with their center lines substantially perpendicular to the plane of the bottom surface of the base, a head structure 13 slidably mounted on the standards 11, a handwheel 14 mounted on the head structure for moving the latter longitudinally of the standards toward and away from the base 10, a bed structure 15 mounted on the standards between the head structure 13 and the base 10, a dished plate 16 mounted on the bottom end of the head structure and having its convex side facing downwardly, a dished plate 17 mounted on the top end of the bed structure 15 and having its concave side facing upwardly, and a blade 18 disposed within and extending transversely of the bed structure 15 and rigidly supported on the standards 11 and 12.

The base 10 comprises a hollow body of rounded shape having a top wall 20 and a flange 21 marginally surrounding the top wall and extending substantially perpendicularly therefrom, this flange being provided with tapped holes 22 opening to its bottom edge for the reception of screw fasteners for mounting the juice extractor on a suitable support, such as a table or cabinet. The base has a V-shaped notch 23 extending inwardly from the side wall past the center thereof and provided with a rounded inner end and has a flange 24 extending perpendicularly from the top wall 20 along the edge of the notch 23. The base is provided with apertured bosses 25 and 26 and the standards 11 and 12 are provided with reduced end portions 27 and 28 respectively, extending through the bores of the bosses 25 and 26 externally screw threaded at their distal ends. The annular shoulders provided at the inner or proximal ends of the reduced end portions 27 and 28 of the standards rest upon the top ends of the bosses 25 and 26 respectively, and nuts 29 and 30 are threaded onto the screw threaded portions of the reduced ends 27 and 28 of the standards and bear against the bottom ends of the corresponding bosses to firmly secure the standards to the base, so that the standards extend upwardly from the base in spaced apart and substantially parallel relationship to each other with their longitudinal center lines substantially perpendicular to the plane of the bottom surface of the base.

The notch 23 in the base is of a size to receive the bottom portion of a conventional fruit juice glass in the inner portion thereof.

The standards 11 and 12 are in the form of elongated rods of cylindrical shape and, in addition to the end portions 27 and 28 of reduced diameter at their lower ends have elongated portions 31 and 32 at their upper ends which provide at their lower or proximal ends annular shoulders 33 and 34 on the standards 11 and 12 respectively. Near their upper ends, the standards are provided with rack teeth, as indicated at 35 and 36, which rack teeth are disposed at the same sides of a plane which includes the longitudinal center lines of both standards.

The head structure 13 comprises a hollow body including a cylindrical flange or skirt 38 and a domed portion 39 joined at its open end to the upper end of the skirt 38 and closing the upper end of the latter, and a flat bottom wall 40 disposed within the cylindrical skirt 38 at the lower end of the skirt and closing the lower end of the hollow head structure. This bottom wall has a diametrically extending, upwardly curved formation 41 to provide a transversely extending groove in the bottom wall for a purpose to be later described and is secured to the skirt 39 by the angle brackets 37 spaced apart around the edge of the bottom wall 40.

The head structure 13 is also provided with sleeve formations 42 and 43 disposed at respectively opposite sides of the head structure and through which the standards 11 and 12 extend.

Hollow bosses 44 and 45 are formed on and project upwardly from the bottom wall 40 of the head structure within the sleeve formations 42 and 43 respectively, and slidably receive the end portions 31 and 32 of the standards 11 and 12 respectively, and the sleeve formations are provided at their upper ends with inwardly flanged apertures 46 and 47 through which the upper ends of the standards can project when the head structure is moved along the standards toward the base 10.

Bearing blocks 48 and 49 are formed on the bottom wall 40 and project upwardly from the bottom wall adjacent the inner sides of the sleeve formations 42 and 43 respectively, and these bearing blocks are provided near their upper ends with apertures which respectively receive bearing bushings 50 and 51.

A shaft 52 extends transversely of the head structure 13 and through the bearing bushings 50 and 51 in which it is journaled. This shaft is provided with gear teeth adjacent its opposite ends, as indicated at 53 and 54, which gear teeth mesh with the rack teeth 35 and 36 on the standards 11 and 12 to move the head structure longitudinally of the standards toward and away from the base 10 when the shaft 52 is rotated.

A third bearing block 56 is provided on and extends upwardly from the bottom plate 40 between the bearing blocks 48 and 49 and is provided in its upper end with an aperture receiving a bearing bushing 57, while a fourth bearing block 58 extends upwardly from the bottom wall 40 adjacent the boss 45 and is provided near its upper end with an aperture receiving a bearing bushing 59. The bearing blocks 56 and 58 are shorter than the blocks 48 and 49, and a shaft 60 extends through and is journaled in the bushings 57 and 59 carried by the blocks 56 and 58. The shaft 60 is spaced from and substantially parallel to the shaft 52 and has one end extending outwardly of the head structure and its other end adjacent the bearing block 56 provided with gear teeth 61.

A gear 62 is mounted on the shaft 52 between the bearing blocks 48 and 49 and has its teeth in mesh with the gear teeth 61 on the inner end of the shaft 60 and the handwheel 14 is mounted on the end of the shaft 60 projecting outwardly of the head structure 13 and provided on its outer side with a hand knob 63.

With this arrangement, when the handwheel 14 is rotated by the knob 63 the shaft 60 will be rotated and drive the shaft 52. Rotation of the shaft 52 by the engagement of its gear or pinion teeth 53 and 54 with the rack teeth 35 and 36 on the standards will move the head structure longitudinally of the standards toward or away from the base 10 depending upon the direction of rotation of the handwheel 14. As the gear 62 is materially larger than the gear formation on the inner end of the shaft 60, a mechanical leverage is provided to increase the downward force exerted on the head structure by rotation of the handwheel.

The dished plate 16 is of generally circular shape and is secured to the end wall 40 of the head structure at the under side of the end wall by suitable means, such as the clips 65 which are secured to the end wall 40 and marginally engage the plate 16, and this plate faces convexly downwardly and has a transversely extending slot 66 therein disposed in alignment with the groove formation 41 in the bottom plate 40 of the head structure.

The bed structure 15 includes a cylindrical skirt portion 68 having an inwardly directed flange 69 at its upper end and having sleeve formations 70 and 71 at respectively opposite sides thereof through which the reduced end portions 31 and 32 of the standards extend. These sleeves are provided in their upper ends with boss formations 72 and 73 respectively, which slidably receive the standard portions 31 and 32 and provide annular shoulders 74 and 75 at their bottom ends.

A bracket 76 is provided at one end with a boss formation 77 receiving the portion 31 of the standard 11 and resting upon the shoulder 33 at the lower end of the standard portion 31 and with an arm 78 extending from the boss formation 77 toward the standard 12 and provided near its distal end with an aperture 79. A similar bracket 80 is provided with a boss formation 81 receiving the portion 32 and resting upon the annular shoulder 34 of the standard 12 and with a laterally extending arm 82 which projects from the boss formation 81 toward the standard 11 and is provided near its distal end with an aperture 83. The boss formations 77 and 81 are received in the lower end portions of the sleeve formations 70 and 71 respectively, and provide annular spring abutment shoulders at their upper ends.

A coiled compression spring 85 surrounds the standard 11 between the upper end of the boss formation 77 and the annular shoulder 74 in the sleeve formation 70 and a corresponding coiled compression spring 86 surrounds the standard 12 between the upper end of the boss formation 81 and the annular shoulder 75 in the sleeve formation 71. These springs support the bed structure 15 on the standards for limited freedom of resiliently resisted movement of the bed structure toward the base 10 of the device.

A post 88 has a reduced lower end received in the aperture 79 in the bracket arm 78 and extends upwardly from the bracket arm, while a similar post 89 has a reduced lower end received in the aperture 83 in the bracket arm 82 and extends upwardly from this bracket arm. The posts 88 and 89 are disposed in spaced apart and substantially parallel relationship to each other, and the blade 18 extends between the posts 88 and 89 and is secured at its respectively opposite ends to these posts.

The blade 18 is of elongated, rectangular shape in side elevation and of somewhat triangular shape in end elevation or cross section, and has its upper edge beveled and serrated, as indicated at 90, to provide a cutting edge. The blade is provided with spaced apart grooves, as indicated at 91 and 92, in the respectively opposite sides thereof, which grooves extend transversely of the blade from the cutting edge to the bottom edge thereof and provides passages for the flow of juice downwardly of the blade. The grooves are of such cross sectional dimension and are so spaced that, while they provide for the free flow of juice from the bottom dished plate 17 to the lower edge of the blade, they effectively strain the juice and prevent pulp and seed from flowing downwardly from the plate 17.

The plate 17 is of substantially circular shape and has an outwardly extending marginal flange 93 which rests upon the upper edge of the bed formation 15, and this plate extends concavely downwardly into the interior of the bed formation. The dished plate 17 is provided in its bottom wall with a transversely extending slot 95 which receives the upper portion of the blade 18, this slot being provided with inwardly directed teeth 96 which fit into the grooves in the sides of the blade to restrict the area of these grooves through which the juice passes from the plate 17 to thereby provide a more effective straining of the juice.

A cup 97 is disposed below the dished plate 17 and has a substantially cylindrical side wall 98 secured at its upper edge to the lower dished plate at the bottom side of the latter and has a bottom wall 99 disposed below the lower edge of the blade 18 and provided at its center with a downwardly flanged pouring spout 100 which is vertically aligned with the inner end portion of the notch 23 in the base to direct juice into a juice glass positioned in the inner end portion of the notch.

In using the device, with the head structure 13 raised to the upper end portions of the standards 11 and 12, a piece of fruit, such as an orange, is placed on the lower dished plate 17 in whole condition. The handwheel 14 is then rotated in a direction to move the head structure 13 downwardly toward the bed structure 15. The upper dished plate 16 will contact the upper side of the orange and force the bottom side of the orange against the cutting edge 90 of the blade 18. As the pressure is continued, the cutting edge of the blade will penetrate the lower portion of the rind on the orange and juice will start to flow from the orange through the cut in the rind thereof past the blade 18 and into the lower portion of the cup 97. With continued pressure, the bed structure 15 is moved downwardly against the force of the springs 85 and 86, so that the cutting edge of the knife is progressively disposed further above the bottom of the lower dished plate 17 and continues to sever the orange rind and, at the same time, the upper portion of the rind is forced toward the lower portion. At the end of the operation, the upper and lower portions of the rind are forced together, as is shown in Figure 7, and the rind is completely severed into two separate pieces by the knife 18, the groove formation 41 in the bottom plate 49 of the head providing clearance for the cutting edge of the knife if the springs 85 and 86 are fully compressed. After the head structure 13 has been moved to its limiting lower position and all of the juice has been extracted from the orange, the rotation of the handwheel 14 is reversed and the head structure returned to the upper end portions of the standards, whereupon the rind of the squeezed orange is removed from the plate or pan 17 and a new piece of fruit may be placed on this pan for the extraction of the juice therefrom.

In order to render the knife 18 removable for cleaning or sharpening, the lower ends of the posts 88 and 89 are detachably secured in the bracket arms 78 and 82 by spring pressed latches 101 and 102 which are mounted on the bracket arms and can be manually moved to release the posts, when desired.

The invention may be embodied in other specific forms without departing from the spirit or essential characteristics thereof. The present embodiment is, therefore, to be considered in all respects as illustrative and not restrictive, the scope of the invention being indicated by the appended claims rather than by the foregoing description, and all changes which come within the meaning and range of equivalency of the claims are, therefore, intended to be embraced therein.

What is claimed is:

1. A fruit juice extractor comprising a base having a notch therein for receiving a juice glass, standards extending upwardly from said base in spaced apart and substantially parallel relationship to each other and having rack teeth thereon at locations spaced from said base, a hollow head structure disposed between said standards and having sleeve formations at respectively opposite sides thereof slidably receiving said standards, a first shaft extending transversely of said head structure and journaled therein, gear teeth on said first shaft meshing with the rack teeth on said standards for moving said head structure longitudinally of said standards upon rotation of said first shaft, a second shaft journaled in said head structure and having one end projecting outwardly of the latter, gear means drivingly connecting said second shaft to said first shaft, shaft rotating means connected to said second shaft at said one end thereof, a hollow bed structure disposed between said standards and between said head structure and said base and having sleeve formations disposed at respectively opposite sides thereof slidably receiving said standards, spring abutment formations disposed one on each of said standards between said bed structure and said base, compression springs disposed between said spring abutments and said bed structure sleeve formations permitting a limited freedom of resiliently resisted movement of said bed structure toward said base when said bed structure is subjected to pressure by said head structure, a blade extending transversely of said bed structure between said standards and having a cutting edge along its top edge and spaced apart grooves extending downwardly from said cutting edge, means supporting said blade on said standards against movement of the former relative to the latter, a lower dished pan supported on the top of said bed structure and having an upwardly facing concave side and a transversely extending slot receiving said blade, an upper dished pan mounted on the bottom of said head structure and having a downwardly facing convex side and a transversely extending slot which receives the upper portion of said blade when said head structure forces said bed structure toward said base against the force of said springs, and a cup mounted on said bed structure below said lower dished pan and having a bottom wall disposed below said blade and provided with a pouring spout aligned with the inner portion of the notch in said base, said blade being effective to sever a piece of fruit compressed between said dished pans and the grooves in said blade providing passages for the flow of juice from the slot in said lower dished pan into said cup.

2. A fruit juice extractor comprising a base, standards extending perpendicularly from said base in spaced apart and substantially parallel relationship to each other, a head structure disposed between and slidably mounted on said standards, a shaft extending transversely of and journaled in said head structure and having a gear connection with said standards for moving said head structure along said standards toward and away from said base, shaft rotating means mounted on said head structure and drivingly connected to said shaft, a bed structure disposed between and slidably mounted on said standards between said head structure and said base, spring abutments on said standards between said bed structure and said base, springs interposed between said spring abutments and said bed structure giving the latter a limited freedom of resiliently resisted movement toward said base, a blade rigidly mounted on said standards and extending transversely of said bed structure with its cutting edge adjacent the end of said bed structure nearest said head structure, said bed structure being movable past said blade toward said base when subjected to pressure from said head structure sufficient to overcome the force of said springs, a lower dished plate mounted on said bed structure at the end of the latter nearest said head structure and having a concave side facing said head structure and a transversely extending slot receiving said blade, and an upper dished plate mounted on said head structure at the end of the latter nearest said bed structure and having a convex side facing said bed structure and a transversely extending slot adapted to receive the portion of said blade adjacent the cutting edge thereof when the bed structure is moved toward said base by pressure exerted thereon by said head structure.

3. A fruit juice extractor comprising a base, standards extending perpendicularly from said base in spaced apart and substantially parallel relationship to each other, a head structure disposed between and slidably mounted on said standards, a shaft extending transversely of and journaled in said head structure and having a gear connection with said standards for moving said head structure along said standards toward and away from said base, shaft rotating means mounted on said head structure and drivingly connected to said shaft, a bed structure disposed between and slidably mounted on said standards between said head structure and said base, spring abutments on said standards between said bed structure and said base, springs interposed between said spring abutments and said bed structure giving the latter a limited freedom of resiliently resisted movement toward said base, a blade rigidly mounted on said standards and extending transversely of said bed structure with its cutting edge adjacent the end of said bed structure nearest said head structure, said bed structure being movable past said blade toward said base when subjected to pressure from said head structure sufficient to overcome the force of said springs, a lower dished plate mounted on said bed structure at the end of the latter nearest said head structure and having a concave side facing said head structure and a transversely extending slot receiving said blade, an upper dished plate mounted on said head structure at the end of the latter nearest said bed structure and having a convex side facing said bed structure and a transversely extending slot adapted to receive the portion of said blade adjacent the cutting edge thereof when the bed structure is moved toward said base by pressure exerted thereon by said head structure, and a cup disposed in said bed structure in surrounding relationship to said blade and having a discharge spout between said blade and said base.

4. A fruit juice extractor comprising a base, standards extending perpendicularly from said base in spaced apart and substantially parallel relationship to each other, a head structure disposed between and slidably mounted on said standards, a shaft extending transversely of and journaled in said head structure and having a gear connection with said standards for moving said head structure along said standards toward and away from said base, shaft rotating means mounted on said head structure and drivingly connected to said shaft, a bed structure disposed between and slidably mounted on said standards between said head structure and said base, spring abutments on said standards between said bed structure and said base, springs interposed between said spring abutments and said bed structure giving the latter a limited freedom of resiliently resisted movement toward said base, a blade rigidly mounted on said standards and extending transversely of said bed structure with its cutting edge adjacent the end of said bed structure nearest said head structure, said bed structure being movable past said blade toward said base when subjected to pressure from said head structure sufficient to overcome the force of said springs, a lower dished plate mounted on said bed structure at the end of the latter nearest said head structure and having a concave side facing said head structure and a transversely extending slot receiving said blade, and an upper dished plate mounted on said head structure at the end of the latter nearest said bed structure and having a convex side facing said bed structure and a transversely extending slot adapted to receive the portion of said blade adjacent the cutting edge thereof when the bed structure is moved toward said base by pressure exerted thereon by said head structure, said lower dished plate providing a support for squeezing fruit and said blade closely fitting the slot in said lower dished plate and having spaced apart grooves therein extending substantially from the cutting edge thereof to the edge thereof adjacent said base to provide restricted passages for the flow of fruit juice downwardly from said lower dished plate.

RONALD W. WALKER.

References Cited in the file of this patent

UNITED STATES PATENTS

| Number | Name | Date |
| --- | --- | --- |
| 584,805 | Wonders | June 22, 1897 |
| 599,856 | Middlekauff | Mar. 1, 1898 |
| 620,047 | Neal | Feb. 21, 1899 |
| 1,696,390 | Divine | Dec. 25, 1928 |
| 2,010,629 | Fageol et al. | Aug. 6, 1935 |
| 2,067,555 | Walker | Jan. 12, 1937 |
| 2,572,286 | Smith | Oct. 23, 1951 |